Patented Dec. 17, 1946

2,412,649

UNITED STATES PATENT OFFICE 2,412,649

PROCESS OF SEPARATING 3-PICOLINE, 4-PICOLINE, AND 2,6-LUTIDINE

George Riethof, Mount Lebanon, Pa.

No Drawing. Application June 15, 1945,
Serial No. 599,765

7 Claims. (Cl. 202—42)

This invention relates to a separation process; and more particularly it relates to the separation of 3-picoline, 4-picoline, and 2,6-lutidine from one another.

One of the principal sources of these three compounds, 3-picoline, 4-picoline and 2,6-lutidine is the basic coal tar oils in which they commonly occur associated with one another. These basic coal tar oils may be practically fractionated to produce certain cuts composed predominately of a mixture of 3-picoline, 4-picoline and 2,6-lutidine. Hence, these materials are generally commercially obtained as a basic oil mixture boiling about 140–145° C. Since these compounds boil so closely together, it is not commercially feasible to fractionate such basic oil mixtures into their separate components.

I have disclosed in my co-pending application, Serial No. 535,397, filed May 12, 1944, now Patent 2,383,016, granted August 21, 1945, that contrary to expectations, such bases may be separated from each other and recovered by azeotropic distillation utilizing a maximum boiling azeotrope and the process is carried out by admixing a suitable quantity of phenol with the basic oils.

It might be expected from this discovery that other phenols would be similarly operative. However, my experiments show this not to be true. For instance, the cresols are inoperative.

I have found however, that ortho-hydroxy-chloro-benzene (ortho-chloro-phenol) may be satisfactorily employed and has certain important advantages which are not obtained with phenol. For instance, the presence of the chlorine atom permits distillation to be conducted in a less efficient still or column than in the case of phenol which requires a highly efficient still. That is, the phenol requires a still having about 50 plates or more whereas the ortho-hydroxy-chloro-benzene is successfully used in a still of thirty plates or less and in fact may be used in a packed column packed with Raschig rings or Berl saddles. This is of tremendous advantage from the economic and commercial standpoint and is therefore, highly desirable. With a simple column, appreciable savings in both time and fuel are possible because the distillation operation is more rapid and a lower reflux ratio can be used.

Meta- and para-hydroxy-chloro-benzene do not work because only the ortho compound forms a chelate ring and this appears to be responsible for the new and unexpected successful results obtained.

It is a principal object of this invention to provide a process for the separation of 3-picoline, 4-picoline and 2,6-lutidine from one another and from basic coal tar oils comprised predominately of these compounds.

It is a further object to provide a process for resolving 3-picoline, 4-picoline and 2,6-lutidine containing oils into their separate components which can be easily operated with close control so as to yield commercially pure products.

It is a still further object to provide a new separation process which employs the use of maximum boiling azeotropic mixtures.

Additional objects and the entire applicability of the present process will become more apparent from the description of the invention given hereinafter.

These objects are accomplished according to the process of my invention by admixing the indicated basic oils with a suitable quantity of ortho-hydroxy-chloro-benzene and distilling from this mass the maximum boiling azeotropes of the basic components of the oil with ortho-hydroxy-chloro-benzene and separately collecting the various fractions.

The process of this invention is more fully illustrated in the following examples, in which all parts are by weight unless otherwise specified.

Example I

A commercial mixture of 200 parts of a basic coal tar oil containing approximately 30% 2,6-lutidine, 35% 3-picoline and 35% 4-picoline is charged into the still pot of a good efficiency fractionating column. To this basic oil is added 624 grams of commercial ortho-hydroxy-chloro-benzene, a ratio of ortho-hydroxy-chloro-benzene to basic oil of about 3.2 to 1. The phenol/basic oil mixture is then subjected to fractional distillation through the column. A forerun of approximately 1% of the total mixture is collected, after which the maximum boiling azeotropes of 2,6-lutidine, 3-picoline, and 4-picoline are collected in that order and at a temperature in the range of 178½ to 184° C., at about 750 mm. of pressure. A still of 20 to 30 plates or less may be employed in the carrying out of the operation of this example.

In order to obtain 3-picoline of high purity the middle or 3-picoline/ortho-hydroxy-chloro-benzene azeotrope is again fractionated through a similar column and a middle fraction of 80% is collected. This middle fraction is then treated with an excess of sodium hydroxide solution and the 3-picoline is distilled off.

The 2,6-lutidine and the 4-picoline fractions are treated in a similar fashion in order to obtain the substantially pure compounds.

The temperature range given above may vary somewhat depending upon the barometric pressure. In the example, the pressure was approximately 750 millimeters and it will be noted that with the ortho-hydroxy-chloro-benzene lower temperatures may be employed which is highly advantageous in fuel economy and heating equipment.

Example II

In this example 740 parts of ortho-hydroxy-chloro-benzene and 200 parts commercial basic oils are employed, a ratio of ortho-hydroxy-chloro-benzene to basic oil of about 3.7 to 1. The process is otherwise as described in Example I, with the exception of a forerun of about 110-120 parts consisting substantially of ortho-hydroxy-chloro-benzene.

The ratio of ortho-hydroxy-chloro-benzene to basic oils, as illustrated in the above examples, may be varied from the examples, where at least about 3.00 parts by weight of ortho-hydroxy-chloro-benzene for each part by weight of basic oil are employed. For efficient operation of the process, it has been found preferable to employ an amount of ortho-hydroxy-chloro-benzene to form an azeotrope with all basic oil present.

The composition of the basic oil being treated may be varied. However, this process is principally applicable to those basic oils which are composed predominately of 3-picoline, 4-picoline and 2,6-lutidine. The ratio by weight of these latter materials may be varied relative to one another.

I claim:

1. The process of separating a mixture predominately containing at least two of the bases 3-picoline, 4-picoline, and 2,6-lutidine which comprises including in the mixture ortho-hydroxy-chloro-benzene and fractionally distilling the mass.

2. The process of claim 1 wherein the distillates are ortho-hydroxy-chloro-benzene azeotropes of said bases.

3. The process of claim 1, wherein the mass distilled comprises at least about 3.00 parts by weight of ortho-hydroxy-chloro-benzene for each part by weight of the basic oil.

4. The process of claim 1 wherein the distillate fractions boiling in the range between substantially 178.5–184° C. are separately collected.

5. The process of claim 1 wherein the distillate fractions boiling in the range between substantially 178.5–184° C. are separately collected and redistilled.

6. The process of claim 1 wherein the distillate fractions boiling in the range between substantially 178.5–184° C. are separately collected and redistilled and wherein the redistilled fractions are treated to recover the substantially pure base contained therein.

7. The process of separating a mixture containing at least two of the bases 3-picoline, 4-picoline, and 2,6-lutidine which comprises including in the mixture ortho-hydroxy-chloro-benzene, fractionally distilling the mass, and thereafter recovering from the fractions the substantially pure base contained therein.

GEORGE RIETHOF.